No. 760,123. PATENTED MAY 17, 1904.
F. B. HOW.
MACHINE FOR MAKING TYPE WRITER RIBBONS.
APPLICATION FILED SEPT. 26, 1903.
NO MODEL. 2 SHEETS—SHEET 1.

WITNESSES:
H. A. Lamb
M. T. Longden

INVENTOR
Fred B. How
BY
ATTORNEY

No. 760,123. PATENTED MAY 17, 1904.
F. B. HOW.
MACHINE FOR MAKING TYPE WRITER RIBBONS.
APPLICATION FILED SEPT. 26, 1903.
NO MODEL. 2 SHEETS—SHEET 2.
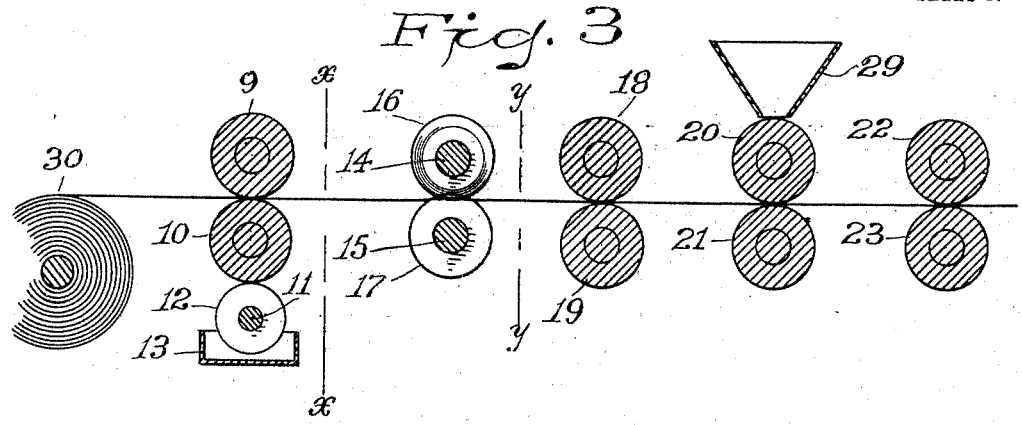
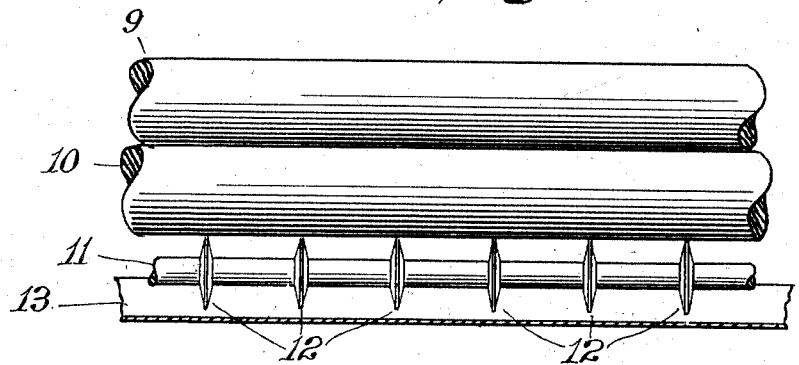
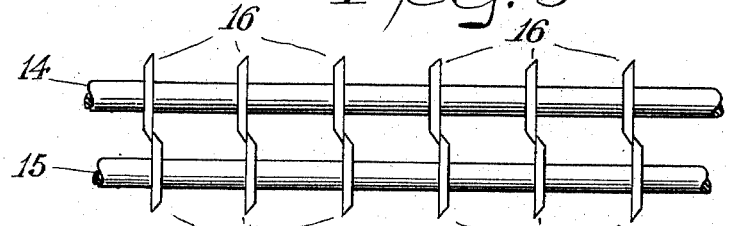
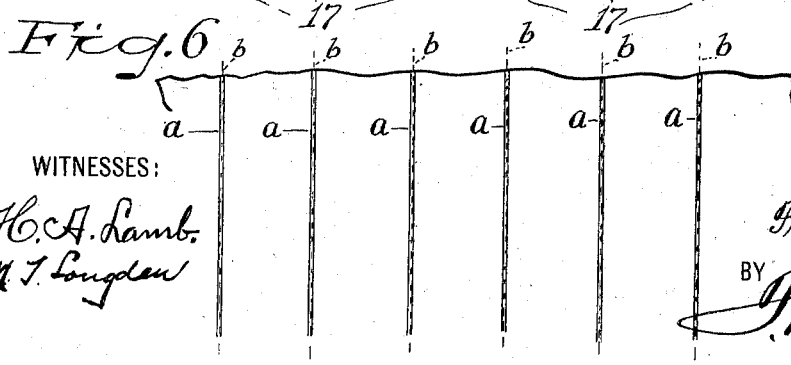
WITNESSES:
H. A. Lamb.
M. T. Lougden
INVENTOR
Fred B. How
BY
[signature]
ATTORNEY No. 760,123. Patented May 17, 1904.

UNITED STATES PATENT OFFICE.

FRED BRADFORD HOW, OF WINTHROP, MASSACHUSETTS.

MACHINE FOR MAKING TYPE-WRITER RIBBONS.

SPECIFICATION forming part of Letters Patent No. 760,123, dated May 17, 1904.

Application filed September 26, 1903. Serial No. 174,802. (No model.)

*To all whom it may concern:*

Be it known that I, FRED BRADFORD HOW, a citizen of the United States, residing at Winthrop, in the county of Suffolk and State of Massachusetts, have invented certain new and useful Improvements in Machines for Making Type-Writer Ribbons; and I do hereby declare the following to be a full, clear, and exact description of the invention, such as will enable others skilled in the art to which it appertains to make and use the same.

My invention relates to certain improvements in machines for making type-writer ribbons, and has for its object to provide a simple and efficient machine for this purpose; and with these ends in view my invention consists in certain details of construction and combination of parts, such as will hereinafter be fully set forth and then specifically be designated by the claims.

Figure 1:
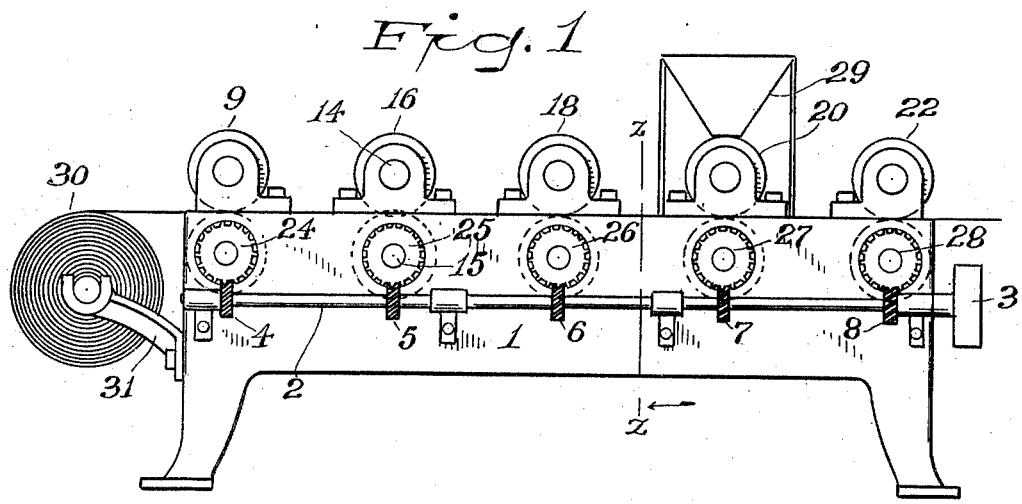
Figure 2:
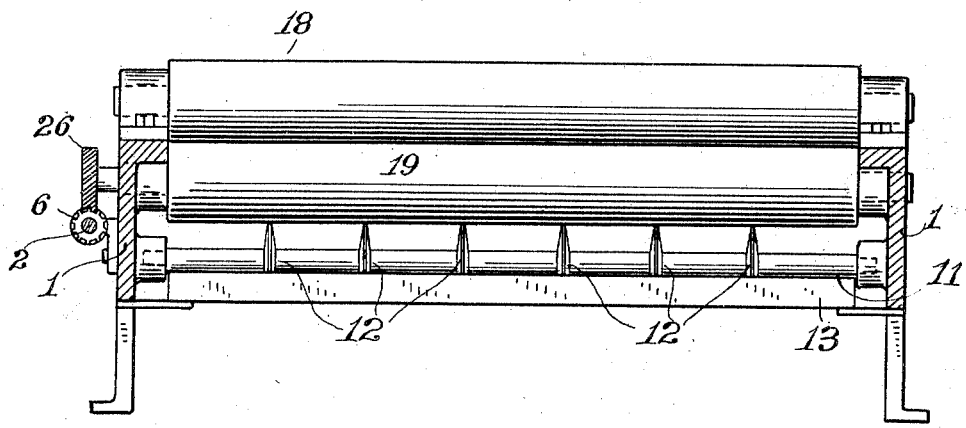

In the accompanying drawings, which form a part of this application, Figure 1 is a side elevation of my improved machine; Fig. 2, a section at the line $z\ z$ of Fig. 1; Fig. 3, a longitudinal sectional elevation of the operative parts of my machine removed from the bed-frame; Fig. 4, a section at the line $x\ x$ of Fig. 3; Fig. 5, a section at the line $y\ y$ of Fig. 3, and Fig. 6 a detail broken plan of a piece of fabric as it appears immediately prior to passing through the inking-rolls.

Similar characters of reference denote like parts in the several figures of the drawings.

1 is any suitable bed-frame, and 2 a long shaft journaled at one side thereof and carrying a power-pulley 3 at one end.

4 5 6 7 8 are worm-gears carried by said shaft for the purpose presently to be explained.

9 10 are rollers journaled one above the other in the frame 1, and 11 is a shaft journaled in the frame and carrying a series of disks 12, which have frictional contact with the lower roller 10. The lower portions of these disks are submerged in a bath of any suitable liquid gum, such as shellac, contained within a trough 13, supported by the frame 1. 14 15 are shafts journaled in said frame and carrying, respectively, cutter-disks 16 17.

18 19 are ironing-rollers journaled one above the other in said frame, and beyond these rollers are the inking-rollers 20 21, also journaled in the frame.

22 23 are finishing-rollers likewise journaled in the frame immediately beyond the inking-rollers.

Outside the frame and carried, respectively, by the journal of the roller 10, the shaft 15, and the journals of the rollers 19, 21, and 23 are worm-gears 24, 25, 26, 27, and 28, which gears mesh with the gears 4, 5, 6, 7, and 8, so that it will be clear that the roller 10, the cutters 17, and the rollers 19, 21, and 23 will have a positive revolution, whereas the remaining rollers and cutters, as well as the gumming-disks, will all be revolved by frictional contact with positively-revolving parts. This manner of arranging and operating these various parts is not essential, since every element may be operated positively, if desired, in several ways, all of which are well known as being within the knowledge and practice of ordinary mechanics.

29 is the ink-reservoir, which is supported on the frame 1 immediately over the roller 20, the bottom of said reservoir being provided with an opening, so that the ink will be constantly applied to this roller. Any of the well-known means for supplying the ink to this roller may be employed, since this is an unimportant feature, and I do not wish to be limited in this respect.

The operation of my improvement is as follows: I take any suitable fabric, preferably in the form of a roll 30, supported on a bracket 31, extending from the frame of the machine, and of a width sufficient to make a plurality of ribbons, and lead the same between the rollers 9 10, the cutters 16 17, the rollers 18 19, the rollers 20 21, and the rollers 22 23 and then draw the fabric continuously either by means of an ordinary winding-roll or in any other suitable manner. Very little power is required to draw the fabric, since the positively-revolving rollers will greatly assist in this operation. The marking-disks 12 are spaced apart by a distance substantially equal to the desired width of the ribbons and will lay narrow stripes of the gum on the face of the roller 10, which latter will transfer the gum to the fabric, so as to form thereon at regular intervals narrow markings. The upper roller 9 acts to iron the fabric, so as to cause the gum to permeate the fabric and to slightly diffuse, whereby well-defined stripes are formed, as shown at $a$, in Fig. 6.

The several pairs of cutters 16 17 are so disposed and alined with respect to the vertical planes of the marking-disks 12 that said cutters will bisect the stripes $a$ longitudinally, as shown by the dotted lines $b$ in Fig. 6, so as to cut the fabric into ribbons of equal width, while the rollers 18 19 will still further iron down these ribbons, so as to "set" their gummed edges.

The ribbons are thoroughly inked by the roller 20, which latter, in conjunction with the roller 21, compresses the ribbons, so as to cause the ink to thoroughly permeate the ribbons, while the rollers 22 23 serve to give a good finish to the ribbons, as well as to cause the ink to be distributed evenly. I have found that the ironing-rollers 18 19 and the finishing-rollers 22 23 may be dispensed with and that ribbons produced without these parts are serviceable; but I prefer to utilize these rollers, since I can thereby obtain a very superior ribbon which will be thoroughly and uniformly provided with selvage edges and ink and which will not readily become dry. The gum prevents the side edges of the ribbons from raveling or becoming frayed, and when properly applied, as above set forth, the result is fully equal to that obtained by selvage edges woven in the ribbons. It will of course be understood that a single marking of the gum when cut in the manner above described will provide two selvage edges, and in this connection I desire to call attention to the fact that any rough edges resulting from the cutting are thoroughly ironed down and caused to become saturated with the gum by the action of the rollers 18 19.

It will of course be obvious that I can dispense with any means for giving positive revolutions to any of the parts of my improvement, since the dragging of the fabric through the machine will cause the various rotary parts to perform their functions, and also stationary cutter-knives may be used instead of the rotary disks, and therefore I do not wish to be limited in these respects.

I have found that the ordinary gum is well adapted for the purpose of laying selvage edges to the ribbons, since it will stiffen and hold together all rough or loose fibers that would otherwise be likely to fray out; but any analogous substance will answer this purpose—as, for instance, any of the well-known gum-varnishes—and I do not wish to be limited in this respect, except in so far as a liquid stiffening compound is concerned.

Having thus described my invention, what I claim as new, and desire to secure by Letters Patent, is—

1. In a machine for making type-writer ribbons, the combination of means for applying to the fabric a liquid stiffening compound in the form of narrow parallel stripes which extend lengthwise of the fabric and are separated by a space substantially equal to the desired width of ribbon, means for bisecting said stripes longitudinally, means for fixing said compound within the fabric, and means for inking the fabric, substantially as set forth.

2. In a machine for making a plurality of type-writer ribbons from an integral piece of fabric, the combination of means for applying to the fabric a liquid stiffening compound in the form of a plurality of narrow parallel stripes which extend lengthwise of the fabric and are separated by a space substantially equal to the desired width of ribbon, means for bisecting said stripes longitudinally whereby a plurality of selvage-edged ribbons is obtained, and means for inking the ribbons, substantially as set forth.

3. The combination of the rollers 9, 10, the marking-disks in contact with the roller 10, the trough containing a liquid stiffening compound within which said disks are adapted to revolve, the rotary cutters, and the inking-rollers and means for applying ink thereto, substantially as set forth.

4. The combination of the rollers 9, 10, the rotary marking-disks in contact with the roller 10, the trough containing a liquid stiffening compound within which said disks revolve, the rotary cutters adapted to operate in vertical planes of said disks, the ironing-rollers, the inking-rollers, means for supplying ink to the top inking-roller, and the finishing-rollers, substantially as set forth.

In testimony whereof I affix my signature in presence of two witnesses.

FRED BRADFORD HOW.

Witnesses:
 BESSIE L. WEBBER,
 THOMAS T. HINKLEY.